United States Patent
Balmer et al.

(10) Patent No.: US 12,517,368 B1
(45) Date of Patent: Jan. 6, 2026

(54) HEAD-MOUNTED DISPLAY WITH A CENTER-MOUNTED SYSTEM FOR PERIPHERAL PROJECTION

(71) Applicant: RealWear, Inc., Vancouver, WA (US)

(72) Inventors: Noah Nicholas Balmer, Vancouver, WA (US); Stephen Pombo, Campbell, CA (US)

(73) Assignee: RealWear, Inc., Vancouver, WA (US)

( * ) Notice: Subject to any disclaimer, the term of this patent is extended or adjusted under 35 U.S.C. 154(b) by 0 days.

(21) Appl. No.: 18/908,507

(22) Filed: Oct. 7, 2024

(51) Int. Cl.
*G02B 27/01* (2006.01)
*A61F 9/02* (2006.01)
*G02B 27/00* (2006.01)
*G06F 3/01* (2006.01)

(52) U.S. Cl.
CPC .......... *G02B 27/0179* (2013.01); *A61F 9/023* (2013.01); *A61F 9/029* (2013.01); *G02B 27/0093* (2013.01); *G02B 27/0172* (2013.01); *G02B 27/0176* (2013.01); *G06F 3/013* (2013.01); *G02B 2027/0178* (2013.01); *G02B 2027/0187* (2013.01)

(58) Field of Classification Search
CPC ..... A61F 9/023; A61F 9/029; G02B 27/0093; G02B 27/017; G02B 27/0172; G02B 27/0176; G02B 27/0179; G02B 2027/0178; G02B 2027/0187; G06F 3/013
See application file for complete search history.

(56) References Cited

U.S. PATENT DOCUMENTS

| | | | |
|---|---|---|---|
| 10,598,959 B1* | 3/2020 | Yang | G02C 11/10 |
| 2012/0326948 A1* | 12/2012 | Crocco | G09G 5/00 |
| | | | 359/630 |
| 2016/0025978 A1* | 1/2016 | Mallinson | G02B 27/0172 |
| | | | 345/8 |
| 2016/0103605 A1* | 4/2016 | Mese | G06F 3/017 |
| | | | 345/174 |
| 2016/0155267 A1* | 6/2016 | Bean | G02B 27/01 |
| | | | 345/633 |
| 2017/0200316 A1* | 7/2017 | Giordano | G06F 1/163 |
| 2018/0220100 A1* | 8/2018 | Ovchinnikov | G06F 3/0484 |
| 2018/0308451 A1* | 10/2018 | Saur | G06F 1/163 |
| 2020/0227034 A1* | 7/2020 | Summa | G10L 15/22 |
| 2022/0019078 A1* | 1/2022 | Keith | A42B 3/042 |

* cited by examiner

*Primary Examiner* — Cory A Almeida
(74) *Attorney, Agent, or Firm* — SHOOK, HARDY & BACON L.L.P.

(57) ABSTRACT

A head-mounted display with a center-mounted system for peripheral projection is disclosed. The head mounted display includes a power source and a housing. The center-housing includes a tracker component that tracks eye movement corresponding to a viewable area on a peripheral portion of a lens of the head mounted computing device. The housing also includes a tinting component that obscures at least a portion of an opposite lens of the head mounted computing device. The housing further includes an image component comprising an image source. In some examples, the tracker component, upon tracking the eye movement towards the viewable area, obscures the opposite lens, and activates the image source. In other examples, the tracker component, upon tracking the eye movement away from the viewable area, unobscures the opposite lens, and deactivates the image source.

14 Claims, 5 Drawing Sheets

HEAD-MOUNTED DISPLAY WITH A CENTER-MOUNTED SYSTEM FOR PERIPHERAL PROJECTION

BACKGROUND

A head-mounted computing device, also generally known as a head-mounted display or "HMD," enables users to mount a mobile computing device on or around their head, facilitating the transport and utilization of advanced computing technologies with greater ease and flexibility. HMDs also enable a user to have interaction with the technology while otherwise remaining engaged in other tasks. For instance, HMDs can be voice activated and hands-free, so that users can focus on other more "physical" tasks, or simply when they desire a more hands-free computing experience.

The displays for HMDs are conventionally microdisplays such as, for example, liquid crystal display (LCD), liquid crystal on silicon (LCOS), organic light emitting diodes (OLED), dot matrix display (DMD), and the like, coupled with refractive optics. Even when the images are projected to appear as if they are part of the real world environment(s), also known as augmented reality (AR), they are projected directly into the field of view. Moreover, images are projected on a single lens, the background imagery on the opposite lens causes distraction and eye strain.

SUMMARY

Embodiments of the present invention relate to a head-mounted display (HMD) with a center-mounted system for peripheral projection. The HMD includes a power source and a housing. The center-housing includes a tracker component that tracks eye movement corresponding to a viewable area on a peripheral portion of a lens of the head mounted computing device. The housing also includes a tinting component (e.g., an LCD shutter) that obscures at least a portion of an opposite lens of the head mounted computing device. The housing further includes an image component comprising an image source. In some examples, the tracker component, upon tracking the eye movement towards the viewable area, obscures the opposite lens, and activates the image source. In other examples, the tracker component, upon tracking the eye movement away from the viewable area, unobscures the opposite lens and activates the image source.

The waveguide optical engine assembly for the HMD, in accordance with aspects herein, comprise a waveguide display, a microprojector, and a grating assembly. The waveguide display includes a display surface and a rear surface and is configured to be located at the peripheral of a lens of the HMD (e.g., safety glasses). The rear surface includes an input portion. The microprojector is configured to project a source image and the grating assembly is adapted to transfer the source image projected from the microprojector to the input portion of the waveguide. The source image received by the input portion of the waveguide is displayed in the display surface of the waveguide display. Moreover, the microprojector and the grating assembly are at least partially enclosed within a housing that is center-mounted in front of a nose bridge of the safety glasses.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

By way of background, head-mounted computing devices (also referenced herein as "HMDs") allow users to mount mobile computing devices on or around their head, enabling the user to transport and utilize advanced technologies with greater ease and flexibility, and allowing a user to have interaction with the technology while otherwise remaining engaged in other tasks. The microdisplays for conventional HMDs can traditionally include LCD, LCOS, OLED, DMD, and the like.

On the other hand, some HMDs, such as those typically utilized in augmented reality (AR) applications, utilize waveguides that generally have transparent, light weight bodies, and are generally known to utilize less energy than conventional microdisplay technologies, have larger fields of view, more extensive eye relief, and provide larger eye boxes for users/viewers. Also, as waveguides generally have a smaller footprint (e.g., thinner, lighter) than conventional microdisplays, which makes them ideal to be used in safety glasses.

Conventional displays and waveguides each have drawbacks. Traditional microdisplay technologies, however, often require a relatively large footprint that is not desirable for head-mounted applications. In addition, the conventional microdisplay technologies can have a limited eye box and eye relief, which requires the HMD to be in a fixed position relative to a wearer's sightlines in order for the user to view a clear image. Conventional waveguides project images directly into the field of view to appear as if they are part of the real world environment(s), also known as AR. However, the background imagery causes distraction and eye strain, rendering the projected image difficult for the user to process. Additionally, while viewing the waveguide image, the user is unable to mentally focus on their surroundings which may present a safety risk.

Aspects disclosed herein allow waveguides to be utilized in a head-mounted display (HMD) with a center-mounted system for peripheral projection. Because the system is center-mounted (e.g. in front of the nose bridge) and has a smaller footprint, it can be incorporated into lightweight eyewear, such as eyeglasses or safety glasses. Moreover, the peripheral projection along with a tinting feature decreases distraction and eye strain, rendering the projected image much easier for the user to view and process.

To do so, in some aspects, the HMD includes a power source and a housing. The housing includes a tracker component that tracks eye movement corresponding to a viewable area on a peripheral portion of a lens of the HMD. The housing also includes a tinting component that obscures at least a portion of an opposite lens of the HMD. The housing further includes an image component comprising an image source. In some examples, the tracker component, upon tracking the eye movement towards the viewable area, obscures the opposite lens, and activates the image source. In other examples, the tracker component, upon tracking the eye movement away from the viewable area, unobscures the opposite lens, and deactivates the image source.

In some aspects, a waveguide optical engine assembly for the HMD, comprises a waveguide display, a microprojector, and a grating assembly. The waveguide display includes a display surface and a rear surface and is configured to be located at the peripheral of a lens of the HMD (e.g., safety glasses). The rear surface includes an input portion. The microprojector is configured to project a source image and the grating assembly is adapted to transfer the source image projected from the microprojector to the input portion of the waveguide. The source image received by the input portion of the waveguide is displayed in the display surface of the waveguide display. Moreover, the microprojector and the grating assembly are at least partially enclosed within a housing that is center-mounted in front of a nose bridge of the safety glasses.

Figure 1A:
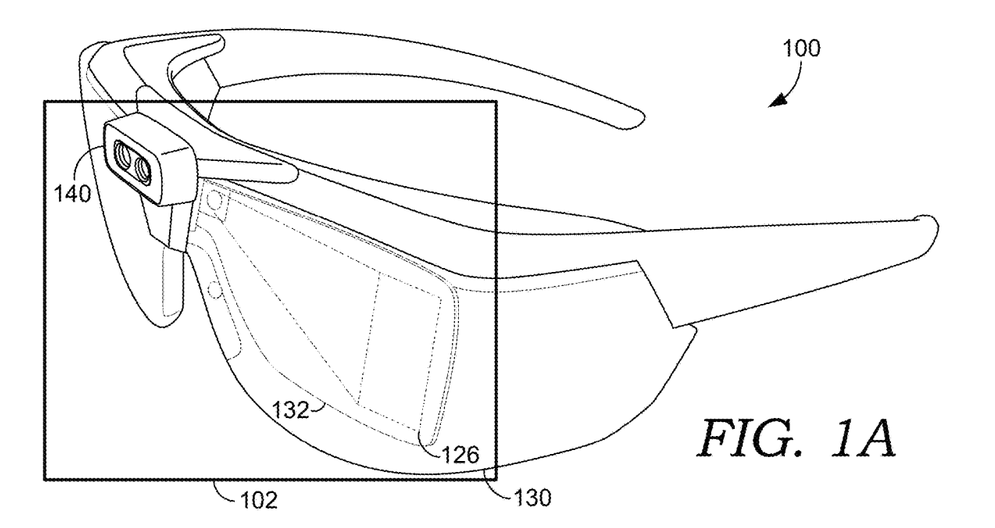
FIG. 1A is an illustration of an example of a waveguide optical engine assembly, in accordance with some embodiments of the present invention.
Figure 1B:
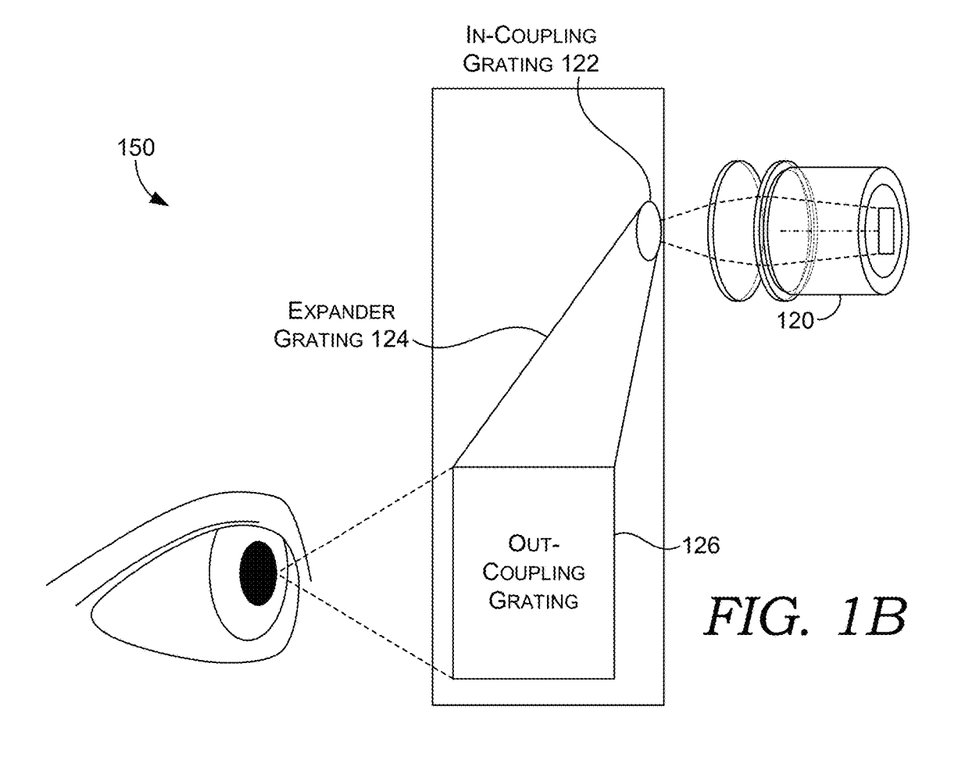
FIG. 1B is an illustration of an example of grating assembly of a waveguide optical engine assembly, in accordance with some embodiments of the present invention.
Figure 2:
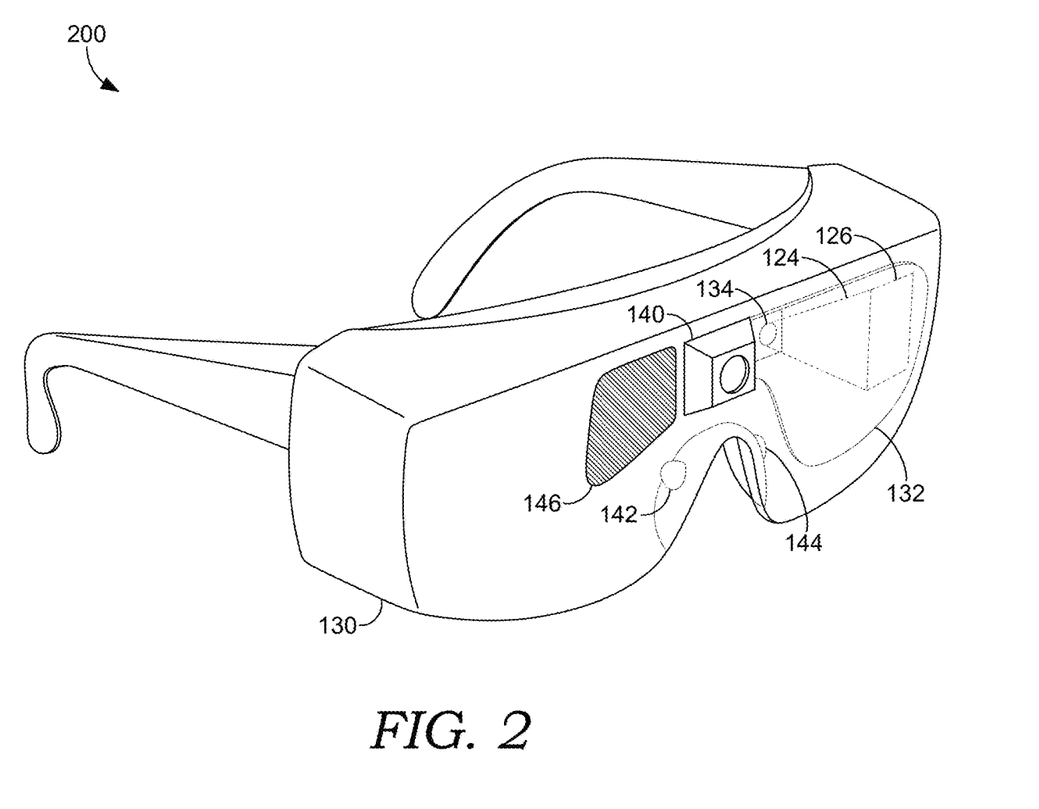
FIG. 2 is an illustration of a head-mounted computing device having a waveguide optical engine assembly, in accordance with some embodiments of the present invention.
Figure 3:
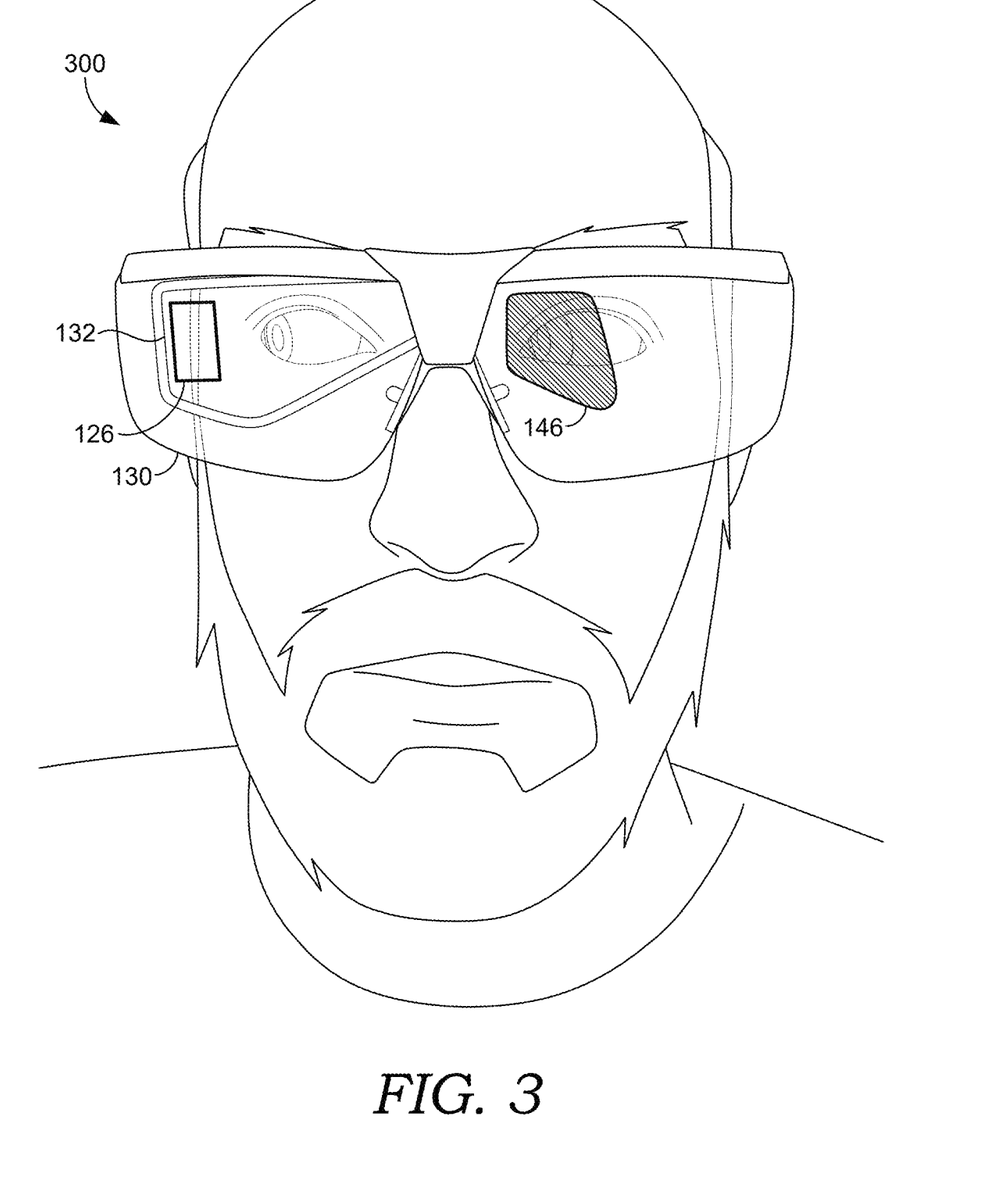
FIG. 3 is an illustration of a viewable area and a tinted area of a head-mounted computing device having a waveguide optical engine assembly, in accordance with some embodiments of the present invention.

Various embodiments of a center-mounted system for peripheral projection and its components and/or an HMD with the center-mounted system for peripheral projection are depicted in FIGS. 1-3, provided herein. Specifically, FIGS. 1A and 1B depicts an illustrations 100 of an example of a waveguide optical engine assembly 102. By way of non-limiting example, the HMT-1 from RealWear, Inc. headquartered in Vancouver, WA, is a head-mounted computing device or HMD 130 that can be referenced and implemented in accordance with some embodiments of the present disclosure. As shown, the waveguide optical engine assembly 102 includes, in some aspects, a waveguide display 132 having a display surface and a rear surface. Importantly, as illustrated, the waveguide display 132 is configured to be located at the peripheral of a lens of the HMD 130. In some aspects, the HMD 130 is embodied in safety glasses.

Although not shown in FIG. 1A and FIG. 1B, the rear surface may include an input portion of the waveguide display. In operation, a microprojector 120 is configured to project a source image. A grating assembly 150 is adapted to transfer the source image projected from the microprojector 120 to the input portion of the waveguide display 132 and the source image is displayed in the display area 126 (or out-coupling grating) of the waveguide display 132. In some aspects, the grating assembly 150 includes an in-coupling grating 122, an expander grating 124, and an out-coupling grating 126. The in-coupling grating 122 accepts the projection and directs the light into the expander grating. The expander grating 124 spreads the projected light through the material directing it to the out-coupling grating 126. The out-coupling grating 126 is the display area of the waveguide display 132. The microprojector 120 and the grating assembly 122 are at least partially enclosed within a housing 140.

Turning now to FIG. 2 is an illustration 200 of an example of a head-mounted computing device 120 having a waveguide optical engine assembly, in accordance with some of the described embodiments. As illustrated, the housing 140 of the waveguide optical engine assembly is mounted in front of the nose bridge of the head-mounted computing device 130. As shown, the user facing portion of the waveguide optical engine assembly comprises a waveguide display 132.

The housing 140 of the waveguide optical engine assembly may include a tracker component (not shown) that tracks eye movement corresponding to a viewable area 126 such as the waveguide display 132 on a peripheral portion of a lens of the head mounted computing device 130. For example, the tracker component may include one or more eye trackers 142, 144. In some aspects, the tracker component, or portions thereof (such as the one or more eye tracker 142, 144), are outside the housing 140 of the waveguide optical assembly. The one or more eye trackers 142, 144 may track eye movement towards the viewable area 126 of the waveguide display 132 or away from the viewable area 126 or the waveguide display 132, or both. In one example, upon the tracker component tracking the eye movement towards the viewable area 126 of the waveguide display 132, the tinting component may obscure the tinting area 146. Since the viewable area 126 is off-center, the practical effect is that while the user is looking directly forward and not toward the viewable area, the expander grating is not illuminated to the user (even though light is passing through it), and the user is able to view the real-world. In contrast, upon the tracker component tracking the eye movement away from the viewable area 126 of the waveguide display 132, the tinting component may cause the tinting area to return to its unobscured state.

The housing 140 of the waveguide optical engine assembly may also include a tinting component (not shown in FIG. 2) that obscures at least a portion of an opposite lens of the head mounted computing device. For example, the tinting component may obscure a tinting area 146 of the lens opposite the lens comprising the waveguide display 132. The tinting area 146 may relieve a user from distraction or eye strain, allowing the user to focus on the waveguide display 132. In some aspects, the tinting component is an LCD shutter that obscures the tinting area 146. A second tinting area (not shown in FIG. 2) may be directly behind the viewable area 126 of the waveguide display 132 such that source image is projected on the viewable area 126 of the waveguide display 132 without distraction of the environment that would otherwise appear behind the source image.

The housing 140 of the waveguide optical engine assembly may further include an image component (not shown in FIG. 2). The image component may include a microprojector (not shown in FIG. 2). In some aspects, the image component includes a waveguide. In one example, upon the tracker component tracking the eye movement towards the viewable area 126 of the waveguide display 132, the image component may activate the microprojector, causing the source image to be displayed in the viewable area 126 of the waveguide display 132. In contrast, upon the tracker component tracking the eye movement away from the viewable area 126 of the waveguide display 132, the image component may deactivate the microprojector, causing the source image to no longer be displayed in the viewable area 126 of the waveguide display 132.

In some aspects, the head-mounted computing device 130 includes a waveguide display 132 on the peripheral portion of each lens and a tinting area 146 on each lens. In this example, the image component may include software that controls which side of the head-mounted computing device 130 the image component projects an image and which side of the head-mounted computing device 130 the tinting component obscures the tinting area, effectively enabling a user to view the source image with the dominant eye of the user (which may vary from user to user).

In accordance with aspects herein, the housing of the waveguide optical engine assembly can be fixedly and/or movably attached to, a head-mounted computing device 130. Although illustrated as safety glasses, the head-mounted computing device 130 can include, by way of non-limiting example, any headwear that is adapted to receive the head-mounted computing device 130 having the waveguide optical engine assembly. In aspects, the waveguide display 132 is made of protective carbonate material, glass, or plastic. The waveguide display 132 may be a second lens attached to the rear of the lens of the head-mounted computing device 130. In some aspects, the housing 140 is detachable from the head-mounted computing device 130 and can be reversed, enabling a user to select which side of the head-mounted computing device 130 includes the waveguide display 132 and which side of the safety glasses incudes the tinting area 146. In this way, the user is able to configure the head-mounted computing device 130 to again view the source image with the dominant eye of the user.

Although not shown in FIG. 2, the waveguide optical engine assembly and/or the head-mounted computing device 130 may include a power source, devices storing one or more memory one or more executable instructions, and/or one or more processors configured to execute the one or more executable instructions stored in the one or more memory devices.

In FIG. 3, an illustration 300 of a waveguide display 132 and a tinting area 146 of a head-mounted computing device 130 having a waveguide optical engine assembly is provided, in accordance with some embodiments of the present invention. As illustrated, a user is wearing the head-mounted computing device 130. As the user gazes towards the waveguide display 132, the waveguide optical engine assembly causes the source image to appear in the viewing area 126 of the waveguide display 132. At the same time, the waveguide optical engine assembly causes the tinting area 146 to obscure the view of the user in the lens opposite the waveguide display 132. In some aspects, as the user gazes towards the viewing area 126 of the waveguide display 132, the waveguide optical engine assembly causes the source image to appear in the viewing area 126 of the waveguide display 132 and, at the same time, the waveguide optical engine assembly causes tinting areas in each lens to obscure the background for both eyes, enabling the user to focus on the image provided in the viewing area 126 of the waveguide display 132.

Figure 4:
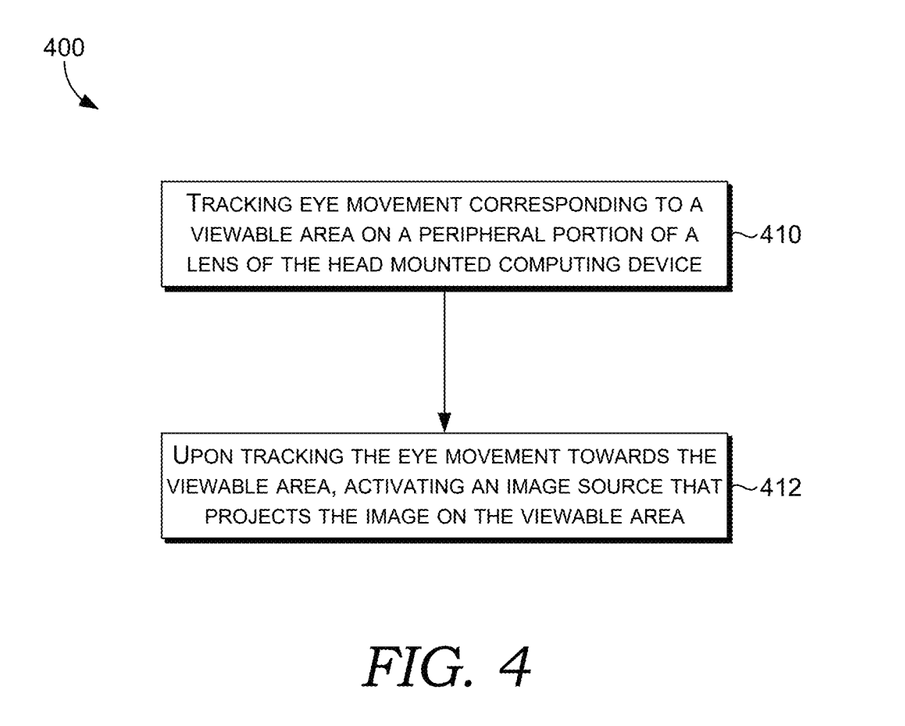
FIG. 4 is a flow diagram showing a method for peripherally projecting an image using a head mounted computing device, in accordance with some embodiments of the present invention.

Referring now to FIG. 4, a flow diagram showing a method 400 for peripherally projecting an image using a head mounted computing device is provided, in accordance with some embodiments of the present invention. Method 400 may be performed by any computing device (such as computing device described with respect to FIG. 5) with access to a waveguide optical engine assembly (such as the one described with respect to FIGS. 1-3) or by one or more components of the waveguide optical engine assembly (such as tracker component, tinting component, and image component as described with respect to FIG. 2).

Initially, at block 410, eye movement corresponding to a viewable area on a peripheral portion of a lens of a head-mounted computing device is tracked. At block 412, upon tracking the eye movement towards the viewable area, an image source is activated that projects the image on the viewable area. In some aspects, an LCD shutter simultaneously obscures at least a portion of an opposite lens of the head-mounted computing device.

Further aspects disclosed herein may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 5:
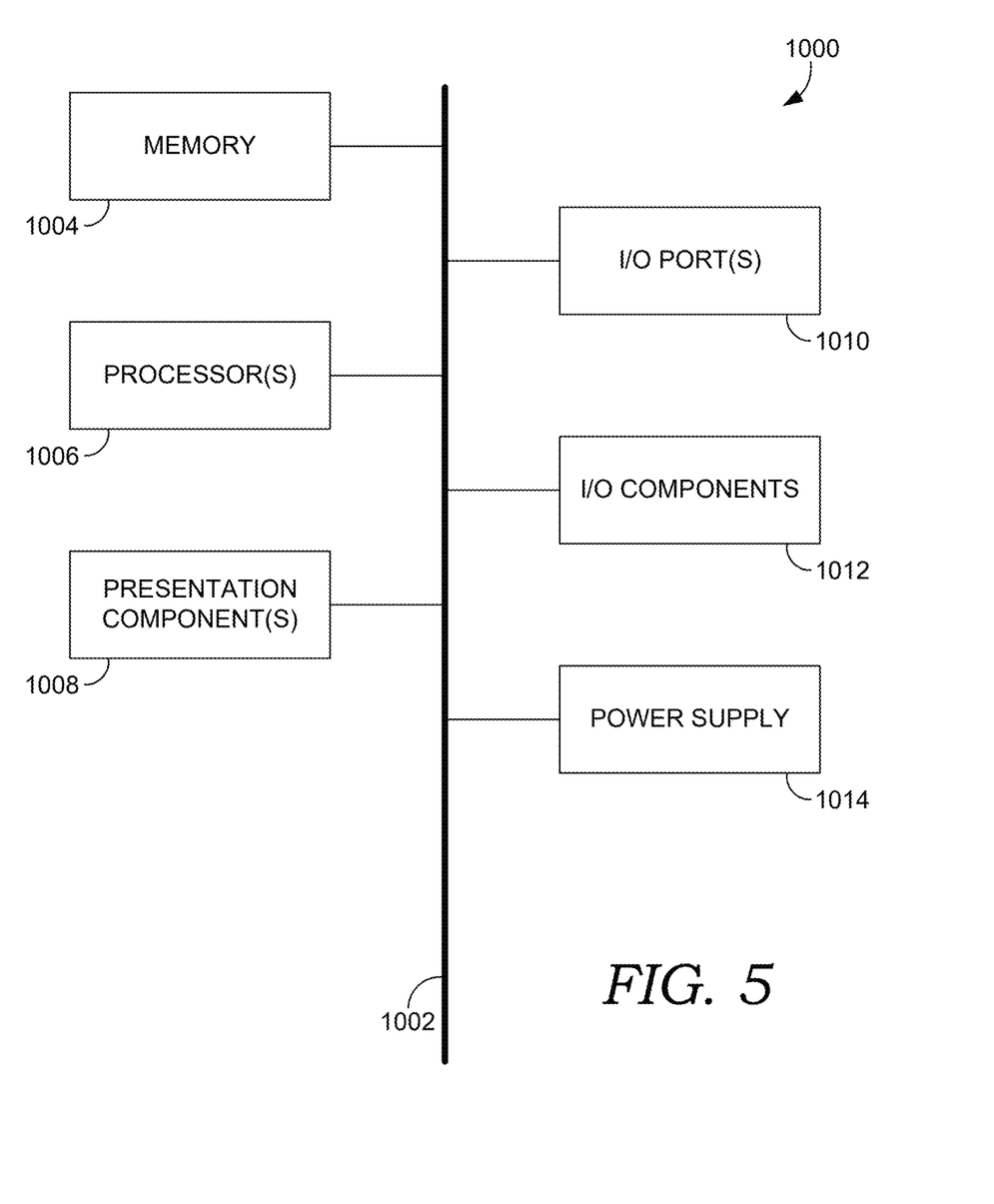
FIG. 5 is a block diagram of an exemplary computing environment suitable for use in implementing some embodiments of the present invention.

Referring to FIG. 5, an exemplary operating environment for implementing aspects disclosed herein, is shown and designated generally as computing device 1020. Computing device 1020 is but one example of a suitable computing environment and is not intended to suggest any limitation as to the scope of use or functionality of the invention. Neither should the computing device 1020 be interpreted as having any dependency or requirement relating to any one or combination of components illustrated.

As shown in FIG. 5, computing device 1020 may include a bus 1022 that directly or indirectly couples the following devices: memory 1024, one or more processors 1026, one or more presentation components 1028, input/output (I/O) ports 1010, input/output components 1012, and an illustrative power supply 1014. Bus 1022 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 5 is merely illustrative of an exemplary computing device that can be used in connection with one or more embodiments of the present invention. Distinction is not made between such categories as "workstation," "server," "laptop," "hand-held device," "portable computing device,"

and the like, as all are contemplated within the scope of FIG. 5 and reference to "computing device."

Computing device 1020 typically includes a variety of computer-readable media. Computer-readable media can be any available media that can be accessed by computing device 1020 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by, for example, computing device 1020, shown in FIG. 5. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1024 includes computer-storage media in the form of volatile and/or nonvolatile memory. The memory may be removable, non-removable, or a combination thereof. Exemplary hardware devices include solid-state memory, hard drives, optical-disc drives, secure digital (SD) cards, micro SD cards, and the like. Computing device 1020 includes one or more processors that read data from various entities such as memory 1024 or I/O components 1010. Presentation component(s) 1028 present data indications to a user or other device. Exemplary presentation components include a display devices (e.g., the waveguide optical engine assembly 110, as shown in the figures), speakers, printing components, vibrating components, light components, and the like.

I/O components 1010 allow computing device 1020 to be logically coupled to other components of the computing device 1020, some of which may be built in. Illustrative components include a microphone, joystick, game pad, satellite dish, scanner, printer, wireless routers, bluetooth devices, and the like. The I/O components 1010 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition associated with a display of the computing device 1020. The computing device 1020 may be equipped with depth cameras, such as stereoscopic camera systems, infrared camera systems, RGB camera systems, touchscreen technology, and combinations of these, for gesture detection and recognition. Additionally, the computing device 1020 may be equipped with accelerometers or gyroscopes that enable detection of motion. The output of the accelerometers or gyroscopes may be provided to the display of the computing device 1102 to render immersive augmented reality (AR) or virtual reality (VR). In some aspects, the output of the accelerometers or gyroscopes may be provided to the display of the computing device 1102 to trigger the tinting or waveguide display (rather than, or in conjunction with, eye tracking).

The head-mounted computing devices in accordance with aspects herein, such as the head-mounted computing device 130, can be set up as or similar to, for example, the computing device 1020 shown in FIG. 5, which can be logically coupled to the waveguide optical engine assembly 102, a power source (i.e., battery or batteries, not shown), a camera, a microphone, and the like. The head-mounted computing devices and the waveguide optical engine assembly 102 are configured to display a visual output (e.g., image, video) communicated thereto, or stored therein. The arrangement of the housing 140 of the waveguide optical engine assembly 102 allows for reduced footprint by allowing the placement of the different computing components, I/O components, structural components, and/or power source components, immediately behind the housing 140, instead of a separate location on the head-mounted computing devices.

In accordance with further aspects disclosed herein, the head-mounted computing devices can include modules (e.g., hardware and/or software) adapted to adjust features of the waveguide optical engine assembly 102, such as power delivery, brightness, contrast, eye tracker component, tinting component, image component, and the like. In accordance with various embodiments, the at least one processor or modules of the head-mounted computing devices can execute instructions stored in memory to adjust the features of the waveguide optical engine assembly 102.

Many variations can be made to the illustrated embodiment of the present invention without departing from the scope of the present invention. Such modifications are within the scope of the present invention. Embodiments presented herein have been described in relation to particular embodiments which are intended in all respects to be illustrative rather than restrictive. Alternative embodiments and modifications would be readily apparent to one of ordinary skill in the art, but would not depart from the scope of the present invention.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the invention.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B, and C" means "(A), (B), (C), (A and B), (A and C), (B and C), or (A, B, and C)."

What is claimed is:

1. A head mounted display with a center-mounted system for peripheral projection comprising:
   a power source;
   at least one lens spanning one or both eyes of a user; and
   a housing comprising:
   a waveguide display associated with a portion of the at least one lens for only one eye of the user;
   one or more eye trackers configured to detect eye movement toward a viewable area of the waveguide display located at a peripheral portion of the at least one lens; and
   an LCD shutter provided on the at least one lens and operable to obscure at least a portion of the at least one lens corresponding to an opposite eye of the user when eye movement toward the viewable area is detected.

2. The head mounted display of claim 1, wherein the waveguide display comprises an in-coupling grating, an expander grating, and an out-coupling grating.

3. The head mounted display of claim 1, wherein the housing is detachable from the head-mounted display and can be reversed, enabling a user to select which side or portion of the at least one lens includes the waveguide display and which side or portion of the at least one lens incudes the obscurable area.

4. The head mounted display of claim 1, wherein the one or more eye trackers, upon tracking the eye movement towards the viewable area, cause the LCD shutter to obscures the portion of the at least one lens corresponding to the opposite eye, and activates the waveguide display.

5. The head mounted display of claim 1, wherein the one or more eye trackers, upon tracking the eye movement away from the viewable area, cause the LCD shutter to return to an unobscured state and deactivate the waveguide display.

6. The head mounted display of claim 1, wherein the viewable area comprises a second lens attached to a rear surface of the at least one lens.

7. The head mounted display of claim 1, further comprising:
   one or more memory devices storing one or more executable instructions; and
   one or more processors configured to execute the one or more executable instructions stored in the one or more memory devices.

8. The head mounted display of claim 1, wherein the waveguide display and the LCD shutter are controlled by software that determines which side or portion of the at least one lens displays an image and which side or portion of the at least one lens is obscured.

9. The head mounted display of claim 1, further comprising a second LCD shutter on the portion of the at least one lens behind the viewable area of the waveguide display.

10. A center-mounted waveguide optical engine assembly comprising:
    at least one lens spanning one or both eyes of a user;
    a waveguide display associated with a portion of the at least one lens corresponding to only one eye of the user and configured to be located at a peripheral portion of the at least one lens;
    a microprojector configured to project a source image to the waveguide display;
    one or more eye trackers configured to detect eye movement toward the waveguide display; and
    an LCD shutter provided on the at least one lens and operable to obscure at least a portion of the at least one lens corresponding to an opposite eye of the user when the one or more eye trackers detect eye movement toward the waveguide display.

11. The waveguide optical engine assembly of claim 10, wherein the one or more eye trackers, upon detecting eye movement toward the waveguide display, activate the microprojector.

12. The waveguide optical engine assembly of claim 11, wherein the one or more eye trackers, upon detecting eye movement toward the waveguide display, cause the LCD shutter to obscure the portion of the at least one lens corresponding to the opposite eye.

13. The waveguide optical engine assembly of claim 12, wherein the one or more eye trackers, upon detecting eye movement away from the waveguide display, cause the LCD shutter to return to an unobscured state.

14. A computer implemented method for peripherally projecting an image using a head mounted display, the method comprising:
    tracking eye movement corresponding to a viewable area on a peripheral portion of at least one lens of the head mounted display;
    upon tracking the eye movement towards the viewable area, activating an image a waveguide display associated with only one eye of the user to present the image within the viewable area; and activating an LCD shutter that obscures at least a portion of the at least one lens corresponding to an opposite eye of the user.

* * * * *